(12) United States Patent
Matsuura et al.

(10) Patent No.: US 6,876,287 B2
(45) Date of Patent: Apr. 5, 2005

(54) BOBBIN STRUCTURE AND TRANSFORMER AND INDUCTOR EMPLOYING SAME

(75) Inventors: Mutsumi Matsuura, Tokyo (JP); Genta Yoshii, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 131 days.

(21) Appl. No.: 10/434,127

(22) Filed: May 9, 2003

(65) Prior Publication Data

US 2004/0066264 A1 Apr. 8, 2004

(30) Foreign Application Priority Data

May 10, 2002 (JP) ..................... 2002-135367

(51) Int. Cl.$^7$ .............................. H01F 27/30
(52) U.S. Cl. .................. 336/198; 336/208; 336/192
(58) Field of Search ................ 336/192, 198, 336/208, 83

(56) References Cited

U.S. PATENT DOCUMENTS

| | | | |
|---|---|---|---|
| 3,441,887 A | | 4/1969 | Costa |
| 3,634,878 A | * | 1/1972 | Davis .................. 336/192 |
| 3,667,697 A | | 6/1972 | Binder ................. 242/72 |
| 3,843,946 A | | 10/1974 | Anderson et al. .......... 336/90 |
| 4,087,709 A | | 5/1978 | Haydon ................. 310/83 |
| 4,715,233 A | * | 12/1987 | Neven et al. ............ 73/861.12 |
| 5,333,800 A | | 8/1994 | Takahata et al. .......... 242/7.01 |
| 5,455,729 A | | 10/1995 | Nelson et al. ........... 360/108 |
| 5,559,486 A | | 9/1996 | Ikenoue et al. .......... 336/90 |
| 5,705,872 A | | 1/1998 | Loge |
| 5,844,459 A | | 12/1998 | Larsen |
| 6,201,324 B1 | | 3/2001 | Suzuki et al. ........... 310/57 |
| 6,288,535 B1 | | 9/2001 | Chass .................. 324/207.2 |
| 6,690,254 B2 | * | 2/2004 | McGrane et al. .......... 336/90 |
| 6,727,793 B2 | * | 4/2004 | Piechnick .............. 336/198 |

* cited by examiner

*Primary Examiner*—Anh Mai
(74) *Attorney, Agent, or Firm*—Adduci, Mastriani & Schaumberg, L.L.P.

(57) ABSTRACT

A bobbin, supporting a winding and intended to be disposed in a circular core, which core includes circular top and bottom core collars having first and second bores, respectively, and a cylindrical member maintaining the top and bottom core collars at a predetermined distance from one another, the first and second bores defining a core bore that is concentric with the rotation axis of the core, includes a spool that supports the winding, top and bottom bobbin collars coupled on either side of the spool, and protrusions disposed on the bobbin, the protrusions permitting the bobbin to be press fit into the circular core so as to prevent relative motion between the circular core and the bobbin. If desired, the protrusions can ensure that the centerline of the bore and the centerline of the bobbin are coincident. A rotary transformer and an inductor employing the bobbin are also described.

18 Claims, 6 Drawing Sheets

BOBBIN STRUCTURE AND TRANSFORMER AND INDUCTOR EMPLOYING SAME

BACKGROUND OF THE INVENTION

The present invention relates to a bobbin structure. More specifically, the present invention relates to a bobbin structure that prevents damage due to oscillations and shocks, and to rotary transformers and inductors employing same.

The present application is based in Japanese Patent Application No. 2002-135367, which was filed on May 10, 2002, and which is incorporated herein by reference, in its entirety, for all purposes.

In the past, magnetic cores, constructed from magnetic materials such as ferrite and silicon steel, and bobbins, where windings are wound, have been employed in constructing transformers and inductors. An example of the bobbin structure is found in a rotary transformer, which is employed for signal input/output for such well-known devices as resolvers, synchros, etc. One specific example is disclosed in the Japanese Unexamined Patent Application Publication S63-318725. As shown in FIG. 9, the rotary transformer includes a ring-shaped case 1, which encloses a resolver 2 and a rotor 3. Resolver stator 5, having resolver stator winding 4, and stator transformer 7, having stator transformer winding 6, respectively, are provided in parallel on the side of case 1. Bobbin 71 is disposed in the stator transformer 7; stator transformer winding 6 is wound on the bobbin 71. In contrast, the rotor winding 12 is directly wound on the rotor transformer 13. Stator transformer winding 6 and resolver stator winding 4 are led to the outside of case 1 via socket 71d having projecting pins 81 and directly by lead line 82, respectively.

On the rotating shaft (not shown), which is provided inside case 1 so that it rotates freely, is provided a resolver rotor 11, having a resolver rotor winding 10, and a rotor transformer 13, having a rotor transformer winding 12, respectively, disposed in a parallel manner. The electric current supply and input/output of the signal to the resolver 2 are carried out via the rotary transformer 3. This stator transformer 7 is fit to the case 1 side with a fastening ring 8, e.g., a "C" ring.

FIG. 10 is an exploded view illustrating the structure of the stator transformer 7 having stator transformer winding 6. Stator transformer 7 includes core portions 70 and 72 between which bobbin 71 is disposed, which core portions are constructed from, for example, a nickel-iron alloy (Permalloy), an iron-cobalt alloy or silicon steel, or ferrite. The external diameter of stator transformer 7 is $\Phi C$. Through holes, i.e., bores, generally denoted 80 accommodating rotor transformers (not shown) are formed in each of core portions 70 and 72. Core portion 72 includes a bottom collar 72c in which a through hole 80, where a rotor transformer (not shown) resides, is formed at its center. Furthermore, a cylindrical standing wall 72a is formed on the bottom 72c; the edge 72b of standing wall 72a is covered by the core portion 70. Notch 72d is formed in the standing wall 72a, which notch is sized to accept a socket 71d, which protrudes from the bobbin 71.

On opposite sides of the spool 71c of the bobbin 71, where a winding (not shown) is wound, collars 71a and 71b are formed. By making socket 71d, having projecting pins 81 formed on one of the collars 71b, which coincides with the notch 72d of the core 72, the bobbin is positioned in the core portion 72, and then collar 71a of the bobbin 71 is covered with the core portion 70. The external diameter $\Phi A$ of the collars 71a and 72b of the bobbin 71 is slightly smaller than the internal diameter $\Phi B$ of the standing wall 72a of the core portion 72.

Core portions 71 and 72 are joined or fused to one another during assembly with well-known adhesives. In other words, an assembly method is employed in which, after positioning the bobbin 71 in the core portion 72, bobbin 71 is fixed to the core portion 72 by dipping it in and/or coating it with well-known adhesives or resin.

In contrast, the rotor transformer 13, having a rotor transformer winding 12, does not employ a bobbin; the rotor transformer winding 12 is wound directly on the rotor transformer 13. By dipping the rotor transformer 13 in well-known adhesives or resin, the rotor transformer winding 12 is fixed to the rotor transformer 13. This construction is dictated by the fact that the rotor transformer 13 normally rotates at high speed. If a bobbin were employed, the bobbin could be separated from the adhesive or resin, or could otherwise be damaged due to the oscillations or inertial force generated during acceleration or deceleration of the rotor transformer.

In addition, a variety of inductors fabricated using a well-known pot-shaped core employ a similar bobbin. The external diameter $\Phi A$ of the collars 71a and 71b of the bobbin 71 is formed so that it is slightly smaller than the internal diameter of the standing wall of the pot-shaped core. Thus, after positioning the bobbin 71 in the pot-shaped core, bobbin 71 is fixed to the pot-shaped core by dipping the assembly in well-known adhesives or resin.

However, with the aforementioned rotary transformer and pot-shaped core, the following problems have been noted. First, in the case where the bobbin 71 is fixed to the core, after the bobbin 71 is positioned in the core, by dipping in well-known adhesives or resin, the number of additional process steps related to adhering and drying are increased, i.e., there are many processes employed to control the amount of adhesives, the adhering area, the drying temperature and the drying time, etc. Therefore, it is difficult to assure the reliability of the finished product. In particular with the respect to the rotary transformer, there are defects such as misalignment between the revolving center of the core and bobbin and, as a result, the precision and reliability of the rotary transformer may be reduced due to the changes in the inertial force during revolution, etc.

Moreover, in the case of rotor transformer 13, the rotor transformer winding 12 is fixed to the rotor transformer 13 by dipping in well-known adhesives or resin even when the rotor transformer will be used for a device with a low revolution speed, e.g., a torque detector. As with the stator transformer 7, the number of process steps related to adhering and drying are increased, i.e., the many process steps require numerous control parameters such as the amount of adhesives, the adhering area, the drying temperature, and the drying time. Thus, it is difficult to assure the reliability of the finished rotor transformer.

What is needed is bobbin having a structure resistant to damage due to oscillation and shocks, making the bobbin suitable for use in transformers and inductors. Moreover, what is needed is a bobbin having a mechanism insuring the precise alignment of the bobbin with respect to a surrounding core.

SUMMARY OF THE INVENTION

Based on the above and foregoing, it can be appreciated that there presently exists a need in the art for a bobbin, which overcomes the above-described deficiencies. The present invention was motivated by a desire to overcome the drawbacks and shortcomings of the presently available technology, and thereby fulfill this need in the art.

In one aspect, the present invention provides a bobbin supporting a winding disposed in a circular core, which core includes circular top and bottom core collars having first and second bores, respectively, and a cylindrical member maintaining the top and bottom core collars at a predetermined distance from one another, the first and second bores defining a core bore that is concentric with the rotation axis of the core. The bobbin advantageously includes a spool that supports the winding, top and bottom bobbin collars coupled on either side of the spool, and protrusions disposed on the bobbin, the protrusions permitting the bobbin to be press fit into the circular core so as to prevent relative motion between the circular core and the bobbin. If desired, the protrusions can ensure that the centerline of the bore and the centerline of the bobbin are coincident.

In another aspect, the present invention provides a rotary transformer, including a circular core made up of circular top and bottom core collars having first and second bores, respectively, and a cylindrical member maintaining the top and bottom core collars parallel to one another and separated from one another by a predetermined distance, and a bobbin made up of a spool adapted to support a winding, top and bottom bobbin collars coupled on either side of the spool, and protrusions disposed on the bobbin, where the first and second bores define a core bore that is concentric with the rotation axis of the core, and the protrusions permit the bobbin to be press fit into the circular core so as to prevent relative motion between the circular core and the bobbin during rotation. If desired, the cylindrical member is a rotary shaft having a shaft bore coincident with the core bore, the bobbin includes first and second bobbin bores and a spool bore located in the first and second bobbin collars and the spool, respectively, the first and second bobbin bores and the spool bore each having a diameter greater than the outer diameter of the rotary shaft, and the spool is coaxial with the core bore.

In a further aspect, the present invention provides an inductor including a core fabricated from a bottom plate, and a cylinder member coupled to and perpendicular to the bottom plate, and a bobbin fabricated from a spool adapted to support a winding, top and bottom bobbin collars coupled on either side of the spool, and protrusions disposed on the bobbin, where the top and bottom collars and the spool include first and second bores and a spool bore, respectively, defining a bobbin bore, the bobbin bore is concentric with the centerline of the cylinder member, the protrusions permit the bobbin to be press fit with respect to the core so as to prevent further relative motion between the core and the bobbin. It may be desirable if the protrusions are disposed in a predetermined pattern in the bobbin bore.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1A is a perspective view of the bobbin of the rotary transformer, and FIG. 1B is a frontal view when the bobbin is disposed in the core;

FIG. 3A is a frontal view and FIG. 3B is a side view;

FIG. 4A is a perspective view, and FIG. 4B is a frontal view when the bobbin is disposed in the core;

FIG. 6A is a frontal view and FIG. 6B is a side view;

FIG. 8A is a frontal view, and FIGS. 8B and C are side views of the embodiments with different arrangements of the protrusions;

DETAILED DESCRIPTION OF THE PREFERRED EMBODIMENTS

The bobbin in a preferred embodiment of the present invention, which is discussed in greater detail below, is described in connection with a rotary transformer; however, the present invention is not so limited. It can be applied to, for example, a bobbin that is disposed in the pot-shaped core of an inductor. Even with respect to a rotary transformer, several configurations are possible. The rotary transformer with a first configuration is that of a rotary transformer in which a stator transformer is provided outside the rotor transformer that is fastened to a rotating shaft. The rotary transformer with a second configuration is that of a rotary transformer in which a stator transformer is provided inside the rotor transformer that is fastened to the rotating shaft. The transformers of these first and second configurations are denoted as an inner-rotor rotary transformer and an outer-rotor rotary transformer, respectively.

Figure 1A:
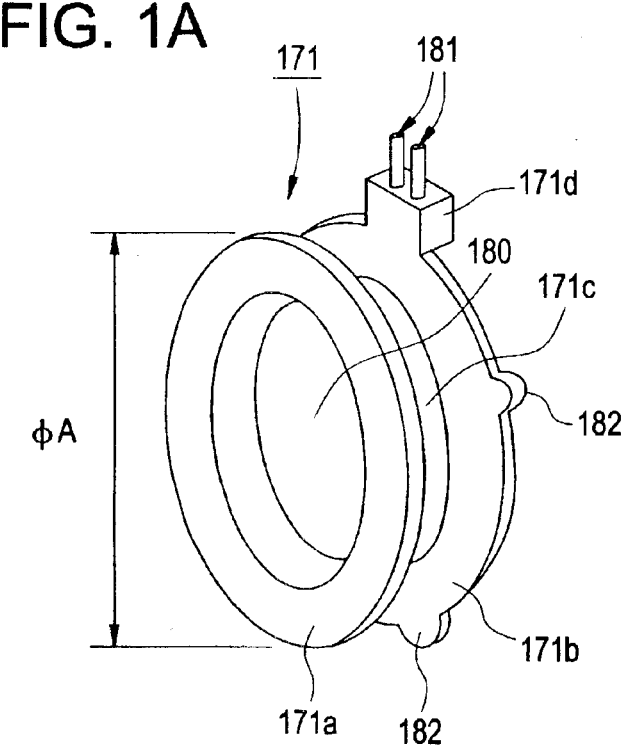
FIGS. 1A and 1B collectively illustrate a first embodiment of the bobbin structure of the present invention applied to the inner-rotor rotary transformer, where
Figure 1B:
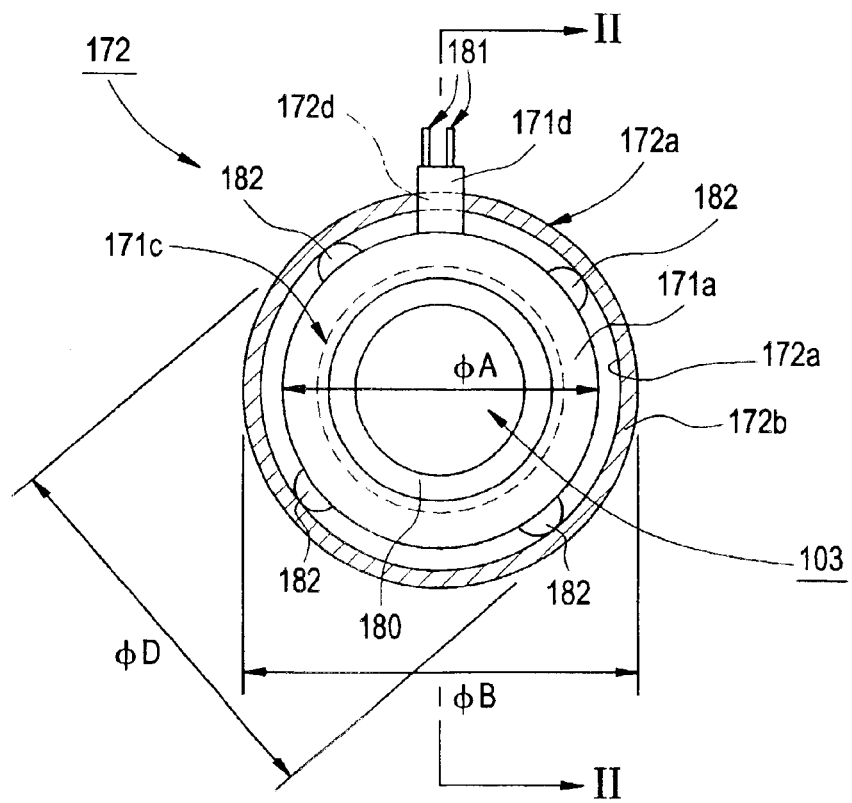
Figure 10:
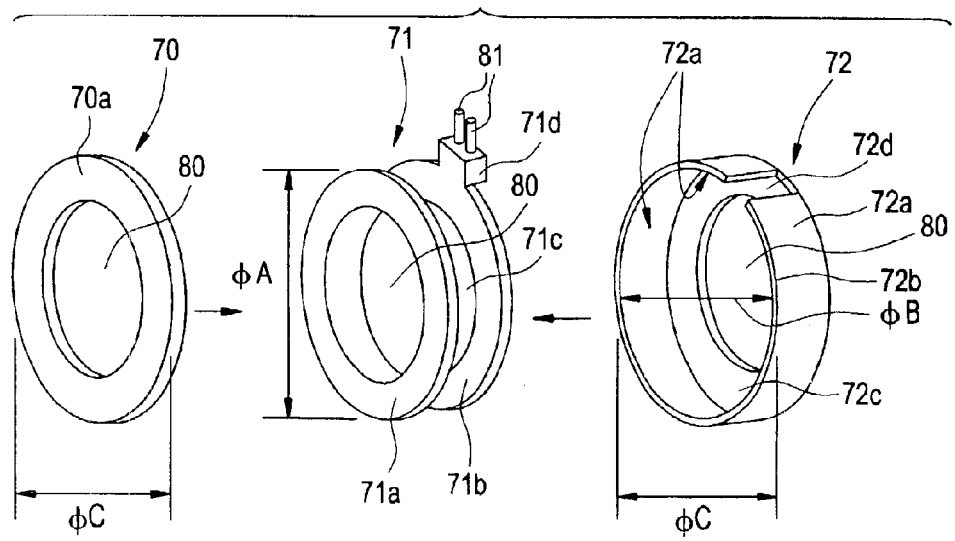
FIG. 10 is an exploded view illustrating the structure of a conventional stator transformer.

A first preferred embodiment of the bobbin structure as applied to the inner-rotor rotary transformer will now be described while referring to FIGS. 1A, 1B, and 2. FIGS. 1A and 1B collectively illustrate the first embodiment of the bobbin structure of the present invention, where FIG. 1A is a perspective view of bobbin 171 of the rotary transformer, and FIG. 1B is a frontal view showing the bobbin 171 disposed in a two part metal can forming a core 170/172 surrounding the bobbin. For the sake of clarity, the core portion 170, corresponding to the core portion 70 depicted in FIG. 10, is omitted from FIG. 2B. It will be appreciated that these figures are drawn as if viewed from the direction A in FIG. 2.

Figure 2:
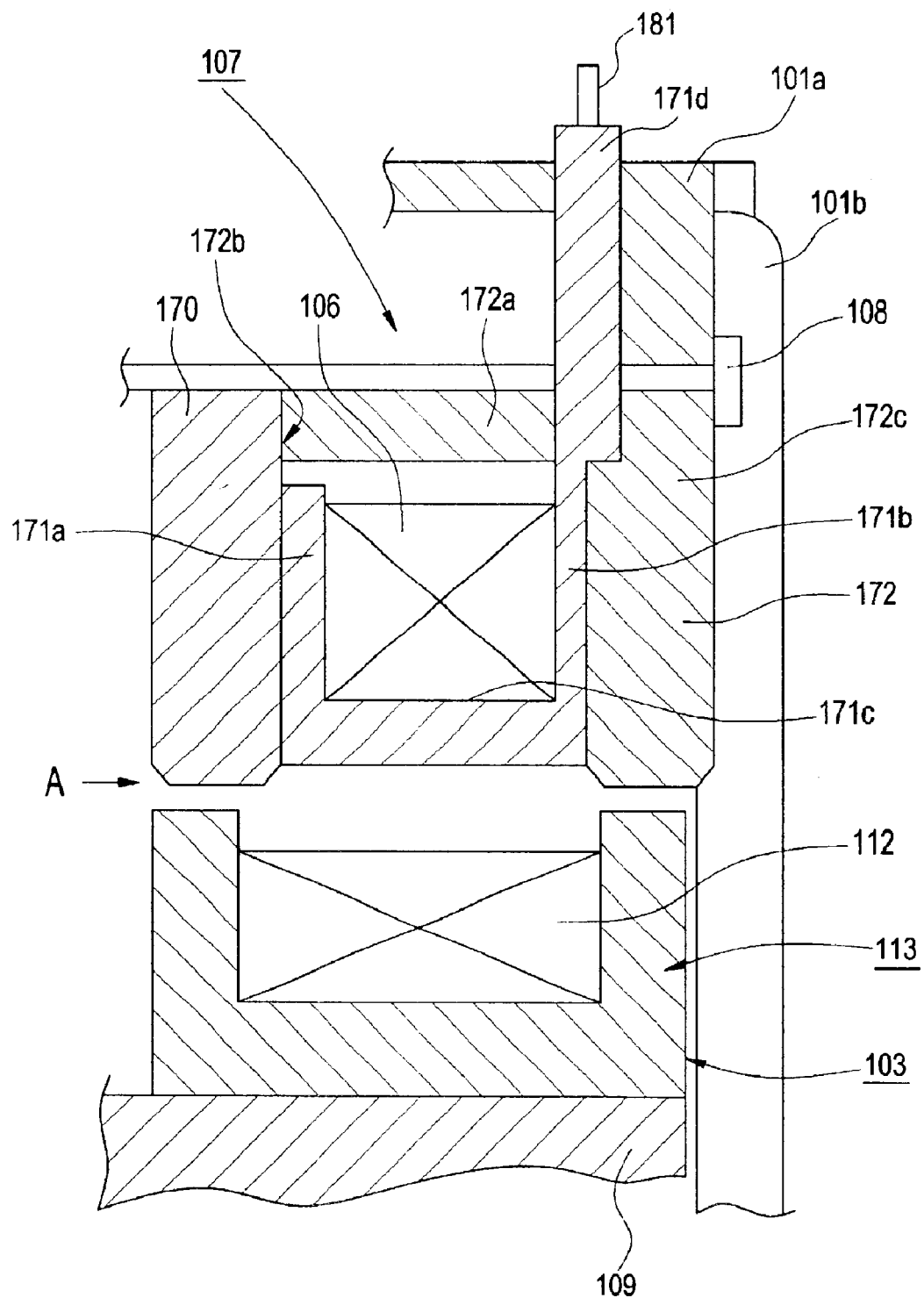
FIG. 2 is a drawing that shows a partially magnified drawing of the inner-rotor rotary transformer containing the bobbin illustrated in FIG. 1B according to the present invention.

It will be noted that FIG. 2 is a sectional view taken along the line II—II established in FIG. 1B. In FIG. 1B, the core portion 170 (corresponding to the core portion 70 shown in FIG. 10) is omitted for clarity. The two core portions 170 and 172 forming the core 170/172 are, for example, constructed from nickel-iron alloy (Permalloy), an iron-cobalt alloy, silicon steel, ferrite, etc. FIG. 2 shows a resolver stator 105 for the case where bobbin 171 of the present invention is applied to the rotary transformer in FIG. 9 and disposed in the stator transformer 107. Bobbin 171 is disposed in the stator transformer 107 and stator transformer winding 106 is wound around the bobbin 171. In addition, FIG. 2 is a partially magnified drawing of the stator transformer 107 and rotor transformer 113 and only half of the stator transformer 107 and rotor transformer 113 are shown relative to the rotating shaft 109.

In FIGS. 1A and 1B, the bobbin 171 of the rotary transformer that is disposed in the core portion 172 is constructed from well-known plastic, or another synthetic resin; it has the following structure. On both sides of spool 171c of the bobbin 171, where a stator winding (not shown) is wound, collars 171a and 171b are provided in a standing manner. Inside the spool 171c, through holes 180, where rotor transformer 103 (refer to FIG. 1B), are provided. One side of the collar 171b is provided with a socket 171d having projecting pins 181. In addition, a multiplicity of protrusions 182 are formed in the same direction as the collar 171b, namely along the circumference of the collar 171b of the bobbin 171 in the direction perpendicular to the spool 171c. Stated another way, the protrusions 182 extend radially outward from the outer periphery of the collar 171b. The multiplicity of protrusions 182 and sockets 171d can be formed on the collar 171a. In addition, the multiple protrusions 182 advantageously can be on wither or both of the collars 171a and 171b.

The external diameter ΦA of collar 171a of the bobbin 171 is formed so that it is slightly smaller than the internal diameter ΦB of the core portion 172. In addition, the diameter ΦD of the largest circumference that connects the peaks of each of the protrusions 182 is slightly greater than the internal diameter ΦB of the core portion 172. Stated another way, the swept diameter ΦD of the bobbin 171 is slightly greater than the internal diameter ΦB of the core portion 172. Moreover, the protrusions 182 formed on the one side of the collar 171b are arranged so that the bobbin 171 maintains the center of revolution relative to the rotary shaft 109. In other words, the peaks of the protrusions 182 are formed at equal intervals relative to the center of the rotation axis and, as shown in FIG. 1B, are tightly fit when the bobbin 171 is disposed in the core portion 172, making it concentric with the core 170/172.

The diameter ΦD of the largest circumference that connects the peaks of each of the protrusions is slightly greater than the internal diameter ΦB of the core portion 172; therefore, when the bobbin 171, wound with stator windings, is pushed in and disposed in core portion 172, both are friction fit and bobbin 171 is fastened in core portion 172. As shown in FIG. 1B, the socket 171d, having projecting pins 181, provided on collar 171b of the bobbin 171, coincides with the notch 172d in core portion 172. When the bobbin 171 is disposed in the core portion 172 from the side of collar 171b, and then the edge 172b of the standing wall 172a of core portion 172 and core portion 170 (shown in FIG. 2) are joined, the assembly can be finished with well-known adhesives, etc. Again, the protrusions 182 formed on the collar 171b can be formed on the collar 172a or can be formed on both collars.

Figure 9:
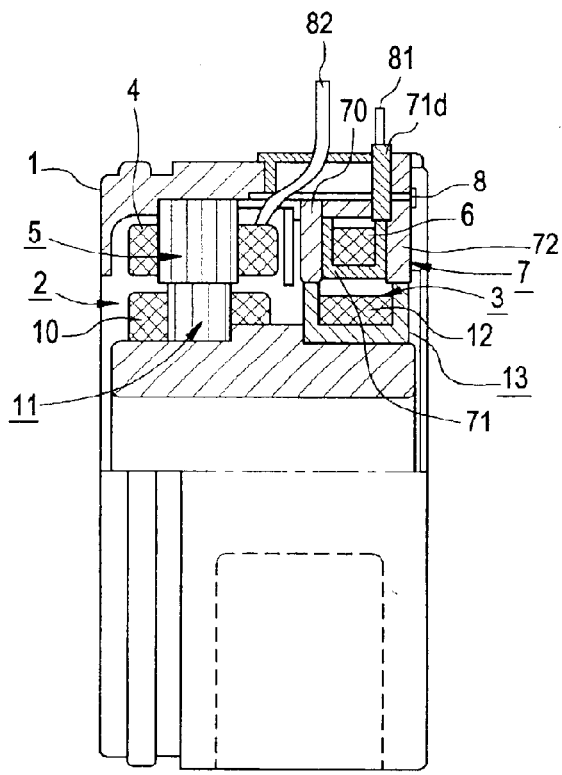
FIG. 9 is a schematic view of a conventional rotary transformer.

As shown in FIG. 2, a stator transformer 107, which includes core 170/172 and a bobbin 171 disposed therein, is provided facing the rotor transformer 113 (corresponding to the transformer 13 described with respect to FIG. 9), producing the inner-rotor rotary transformer. The partially magnified drawing of the rotary transformer shown in FIG. 2 is the same as that described in connection with FIG. 9, except for the structure of the bobbin 171 and, therefore, a detailed description is omitted. By tightly fitting the bobbin 171 having the protrusions 182 to the core portion 172, assembly steps such as adhering and drying, and their controlling processes, can be eliminated while improving the reliability.

A second bobbin structure applicable to a second embodiment according to the present invention, one with an outer-rotor rotary transformer, and a rotary transformer employing same, will now be described with reference to FIGS. 3A, 3B, 4A, 4B and 5. FIGS. 4A and 4B collectively illustrate stator transformer 207, i.e., FIGS. 4A and 4B depict the second preferred embodiment of the bobbin structure of the present invention. FIG. 4A is a perspective view of the bobbin 271 disposed in the stator transformer and FIG. 4B is a frontal view when the bobbin 271 is disposed in the core portion 272, and is a side view, when viewed from the direction of B in FIG. 5. The protrusions 282 are formed on the collar 271a. In FIG. 4B, collar 270a (similar to the collar shown in FIG. 3B) is omitted. The bobbin 271, disposed in the stator transformer 207, advantageously can be is constructed from any well-known plastic or synthetic resin.

Figure 3A:
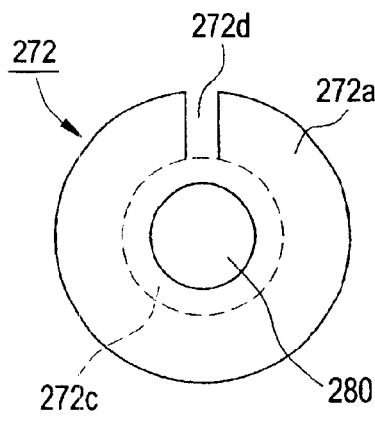
FIGS. 3A and 3B collectively illustrate a stator transformer that receives the bobbin of the rotary transformer of the present invention, where
Figure 3B:
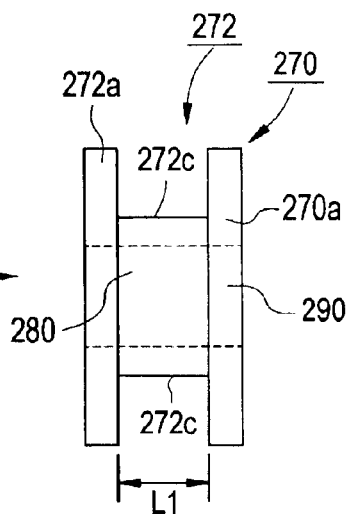
Figure 4A:
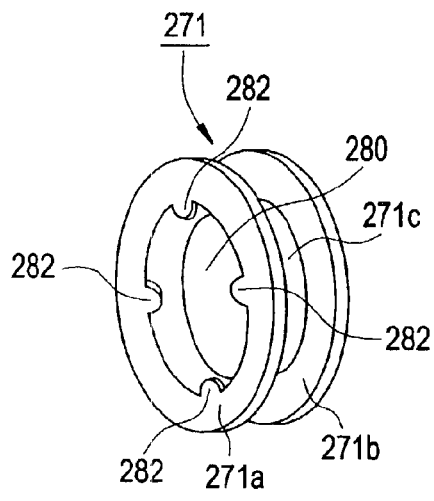
FIGS. 4A and 4B collectively illustrate a second embodiment of the bobbin structure of the present invention, where
Figure 4B:
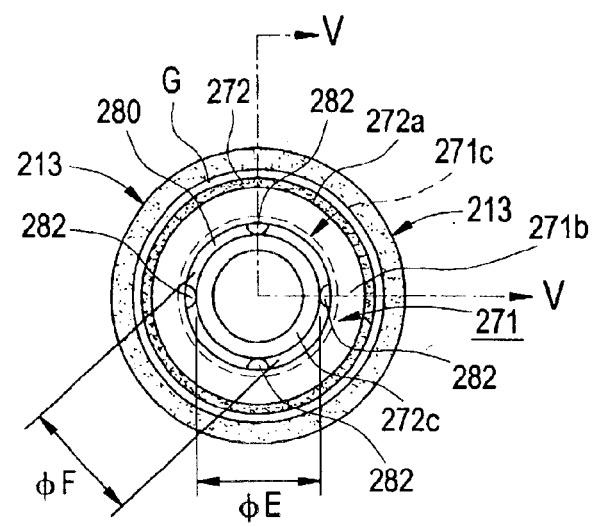

FIGS. 3A and 3B collectively illustrate stator transformer 207. FIG. 3A is a frontal view while FIG. 3B is a side view. FIG. 3A is a frontal view of the core 270/272 as seen from direction C in FIG. 3B. It will be appreciated that the stator transformer 207 is constructed from core portion 270 (corresponding to the core portion 70 shown in FIG. 10) and core portion 272 (corresponding to the core portion 172 shown in FIG. 3A). The core portion 272 is provided with a hollow shaft 272c, which advantageously can be disposed concentric with the centerline of the stator transformer 207. It will also be appreciated that shaft 272c supports a stator winding (not shown). Proximate to the end of hollow shaft 272c, a core collar 272a is provided in a standing manner. Through holes 280 are provided in both collar 272a and hollow shaft 272c. Advantageously, the core 270/272, i.e., core portions 270 and 272, is constructed from magnetic materials, e.g., nickel-iron alloy (Permalloy), an iron-cobalt alloy, silicon steel, or ferrite.

Preferably, the bobbin 271 shown in FIGS. 4A and 4B is press fit on the hollow shaft 272c. Core portion 270, which advantageously includes the through hole 280, comes into contact with the shaft 272c at core collar 272a. In short, the stator transformer 207 is formed by fixing the core portions 270, 272, on opposite sides of the shaft 272c with adhesives. As a result, stator transformer 207 is constructed from the core collar 272a, hollow shaft 272c, and core collar 270a with concentric through holes, i.e., a common bore, and these through holes engage with the stator transformer supporter 253 (shown in FIG. 5), which can be fastened to the case 201 by any known method, screw, pin, rivet, adhesive, etc.

Figure 5:
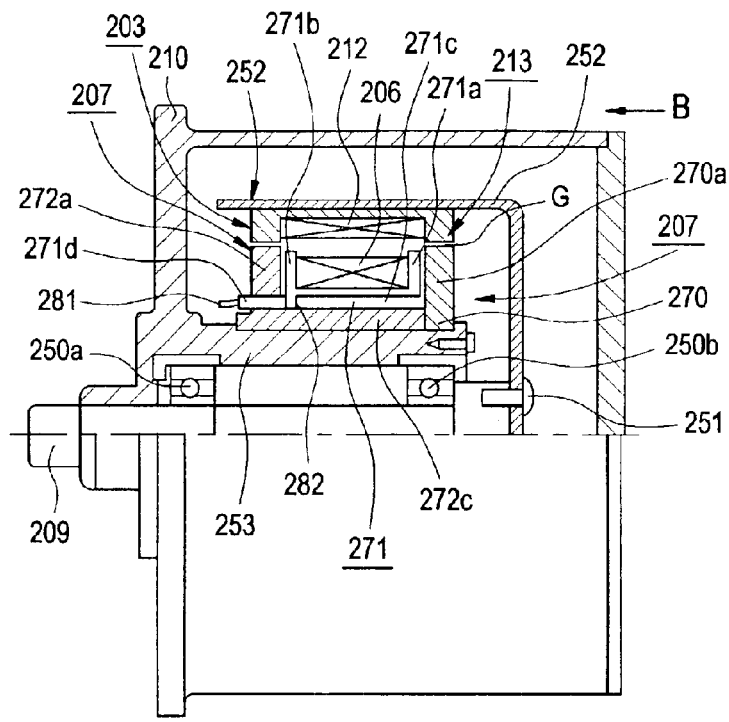
FIG. 5 is a partial cross-sectional view of an outer-rotor transformer that employs the bobbin of the rotary transformer of the present invention.

As described below, a multiplicity of protrusions 282, as shown in FIG. 4A, are formed along with the through holes 280 on the inner circumference of the collar 271a of the bobbin 271. The bobbin 271 is press fit so that the protrusions 282 come into contact with the outside of hollow shaft 272c. As shown in FIG. 5, the socket 271d, having projecting pins 281, which is formed on the bobbin 271, is fit to the notch 272d formed on the core collar 272a, and then the bobbin 271 is disposed in the stator transformer 207.

In FIG. 4A, the bobbin 271 of the rotary transformer, which is disposed in the core portion 272, is constructed from a well-known plastic or other synthetic resin. Collars 271a and 271b are provided on the bobbin 271 in a standing manner on both sides of the spool 271c, which supports the stator winding (not shown). Inside the spool 271c, a through hole 280, where a rotor transformer 203 is provided (similar to transformer 3 in FIG. 1B), is formed. Multiple protrusions 282 are formed, along with the through hole 280 of the collar 271a of the bobbin 271 that receives the hollow shaft 272c, in the direction perpendicular to the spool 271c.

A socket (not shown) having projecting pins formed on the circumference of the collar 271a is formed perpendicular to the collar 271a, so that it can be contained in the notch 272d (similar to the notch depicted in FIG. 3A) formed in the core portion 272. The multiplicity of protrusions 282 and sockets can be formed on the collar 271b side; the multiplicity of protrusions 282 can also be formed on either or both of the collars 271a and 271b.

FIG. 4B is FIG. 3A viewed from the direction of the core region 270a, but omitting the core collar 270a, as shown in FIG. 3B. In FIG. 4B, the bobbin 271 is fit to the hollow shaft 272c in a direction so that the collar 271a of the bobbin 271 and the core collar 272a of the core 272 come in contact. Outside the core portion 272, a gap G that allows outer transformer 213 to rotate is provided. As shown in FIG. 4B, the diameter ΦE of the smallest inner circumference that connects the peaks of each of the protrusions 282 is slightly smaller than the external circumference ΦF of the hollow shaft 272c of the core portion 272. In addition, the protrusions 282 formed on the collar 271a are arranged so that the bobbin 271 remains concentric relative to the revolution axis (not shown) of the core 270/272.

In other words, the peaks of the protrusions 282 are formed at equal intervals relative to the centerline of the hollow shaft 272c. Thus, as shown in FIG. 4B, when the bobbin 271 is disposed in the core portion 272, it is tightly fit to the hollow shaft 272c of the core portion 272 shown in FIG. 3A and becomes concentric with the core portion 272. The protrusions 282 formed on one of the collars 271a can be formed on the other collar 271b, or can be formed on both collars. The diameter ΦE of the smallest internal circumference that connects the peaks of each of the protrusions 282 formed on the collar 271a is slightly smaller than the internal circumference ΦF of the shaft 272c of the core portion 272. Thus, when bobbin 271, which supports the stator winding, is disposed in the core 270/272, they both are tightly fit, i.e., the bobbin 271 is fastened to the core portion 272.

FIG. 5 is a partial cross sectional view of a rotary transformer taken along the line V—V established in FIG. 4B in which the bobbin 271 of the present invention is disposed in the outer-rotor rotary transformer. In FIG. 5, the resolver is omitted. The well-known resolver shown in FIG. 9 can be applied to the outer-rotor rotary transformer. As described below, a rotor transformer 213 is provided in case 201 so that it freely rotates. On the case 201 side, a stator transformer 207, having stator transformer winding 206, is provided by being fastened to the stator transformer supporter 53, which advantageously can be a portion of case 201. A bobbin 271 is disposed in the stator transformer 207; the stator transformer winding 206 is wound around the bobbin 271. In contrast, the rotor winding 212 is wound directly on the rotor transformer 213. It will be noted that the stator transformer winding 206 is lead outside case 201 via the socket 271d, which includes projecting pins 281. Inside case 201, a rotary shaft 9 is provided with bearings 50a and 50b so that it can freely rotate. The rotor transformer 213 is fastened to the shaft 9 via the supporter 252 by a screw 251 so that it can rotate around the stator transformer 207.

The bobbin 271 is fastened to the hollow shaft 272c of the stator transformer 207 with the protrusions 282 formed on the collar 271b. As a result, similar to the case of an outer-rotor rotary transformer, the process steps regarding adhering and drying, and their controlling processes, can be eliminated while improving the reliability of the finished rotating device.

A third preferred embodiment of a bobbin according to the present invention, which can be employed in the outer-rotor rotary transformer, will now be described while referring to FIGS. 6A, 6B, and 7. The overall structure of the outer-rotor rotary transformer where a third preferred embodiment bobbin can be applied is substantially identical to the device shown in FIG. 5. Moreover, the stator transformer 307 used in such a device is substantially identical to the one shown in FIGS. 3A and 3B. For that reason, a detailed description of the overall structure can be omitted.

Figure 6A:
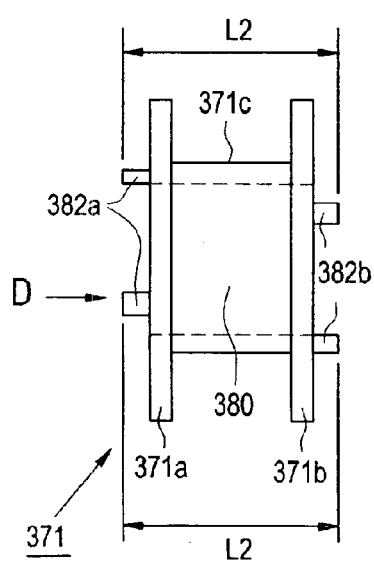
FIGS. 6A and 6B collectively illustrate a third embodiment of the bobbin structure according to the present invention, where
Figure 6B:
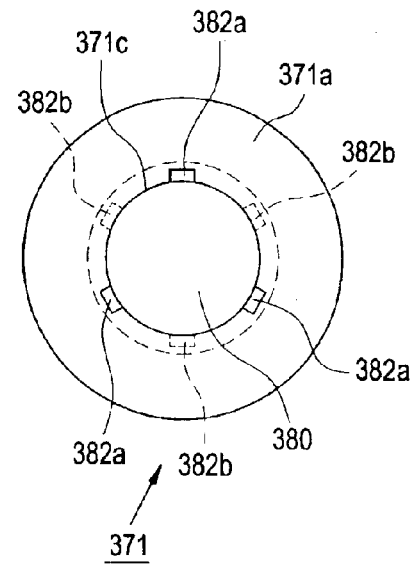

FIGS. 6A and 6B collectively illustrate the third embodiment of the bobbin according to the present invention. FIG. 6A is a frontal view while FIG. 6B is FIG. 6A viewed from the direction D. The bobbin 371 disposed in the stator transformer 307 is constructed from any well-known plastic or other synthetic resin, and is provided with through holes 380 on the spool 371c, which is disposed in the bobbin 371, and which supports a stator winding (not shown), and on collars 371a and 371b. The protrusions 382a and 382b are formed on opposite sides (the outsides) of the collars 371a and 371b of the spool 371c in a standing manner. The protrusions 382a and 382b advantageously can be formed at equal intervals. For example, three of the protrusions 382a are provided at 120-degree intervals. In FIG. 6B, the protrusions 382a and 382b are shifted by 60 degrees from each other.

It will be appreciated that the number of protrusions and the angle formed between adjacent ones of the protrusions can be other than the aforementioned 120°. In those cases, the number and placement of the protrusions should be sufficient to ensure the stability of bobbin 371 when the bobbin 371 is disposed in the stator transformer 307. In addition, when the protrusions 382a and 382b are provided within the collars 371a and 371b, and on the other side (outside) of the spool 371c, they do not need to be provided along the spool 371c. In that case too, the number and angle of the protrusions 382a and 382b should allow bobbin 371 to be stably disposed in the stator transformer 307. The distance L2 between the peaks of protrusions 382a and 382b formed on the collars 371a and 371b in a standing manner is slightly greater than the distance L1 of the inner side of the collars 370a and 372a of the core 370/372 (not shown—similar to elements depicted in FIGS. 3A and 3B). The protrusions 382a and 382b need not be shifted by 60 degrees but advantageously can have identical structures. In other words, the protrusions 382a and 382b can overlap with each other. In addition, it is acceptable for only one of the protrusions 382a and 382b to exist. In that case, the distance L2 between the proximate side of the core collar where the protrusion is not formed and the peaks of the protrusions contacting the opposing collar is slightly greater than the distance L1 that is the inside distance between the core collars 370a and 372a of the core 370/372 (see core 270/272 shown in FIGS. 3A and 3B).

The stator winding is wound around the bobbin 371, and its through hole 380 is fit to the spool 371c of the bobbin 371, and then core portion 370 is fastened to the hollow shaft 372c with adhesives, etc. As a result, the distance L2 between the peaks of protrusions 382a and 382b formed in a standing manner on the collars 371a and 371b is formed to be slightly greater than the distance L1 between the inner sides of the core collars 370a and 372a of the core 370/372

(similar to the arrangement shown in FIGS. 3A and 3B). Therefore, the tips of the protrusions 382a and 382b are pushed by the core collars 370a and 372a and, consequently, the bobbin 371 is securely held within the core 370/372.

Figure 7:
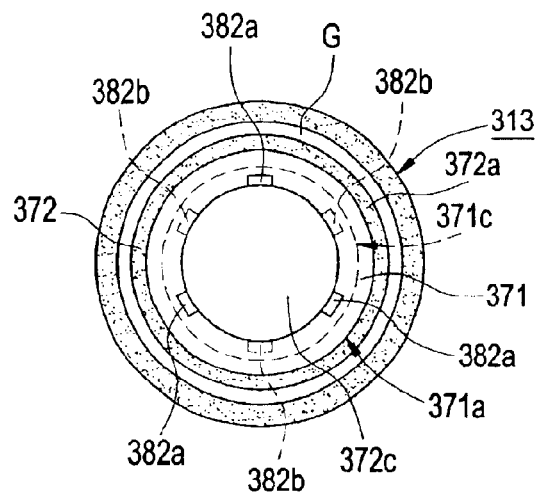
FIG. 7 is a frontal view when the bobbin is disposed in the core shown in FIGS. 6A and 6B.

FIG. 7 is a front view illustrating the bobbin 371 disposed in the core 370/372 as seen from the direction of B in FIG. 5. The protrusions are, as shown in FIGS. 6A and 6B, formed on both collars 371a and 371b of bobbin 371. In FIG. 7, the core collar 370a (similar to core collar 270a shown in FIG. 3B) is omitted. In FIG. 7, the bobbin 371 is fit to the hollow shaft 372c in a direction in which bobbin collar 371b and core collar 372a are disposed adjacent to one another. A gap G that allows outer transformer 313 to rotate is provided on the outside of the core 370/372. Each of the protrusions 382a and 382b are formed in a symmetrical position relative to the center of the axis of revolution and, consequently, bobbin 371 can be disposed in core 370/372 in a stable manner.

As in preferred embodiments described above, the protrusions advantageously can be provided on either one or both of the collars of the bobbin, e.g., bobbins 171, 271, or 371. Moreover, the bobbin, e.g., bobbin 371, is only provided on one of the stator transformer 107, 207, or 307, respectively. However, when the rotor transformer 13 rotates relatively slowly, one of the preferred embodiments of the bobbin according to the present invention described herein advantageously can be employed in fabricating the rotor transformer 113, 213, or 313.

From the discussion thus far, it will be appreciated that the protrusions 272 formed on the collar 271a shown in FIGS. 4A and 4B advantageously can be located inside the spool 271c (see FIGS. 8A, 8B, and 8C), as long as they fulfill the condition in which the diameter $\Phi E$ of the smallest inner circumference that connects the peaks of the protrusions 282 is slightly smaller than the inner circumference $\Phi F$ of the core portion 270 at the opposite side (outer circumference of hollow shaft 272c) from the core portion 272.

Figures 8A, 8B, 8C:
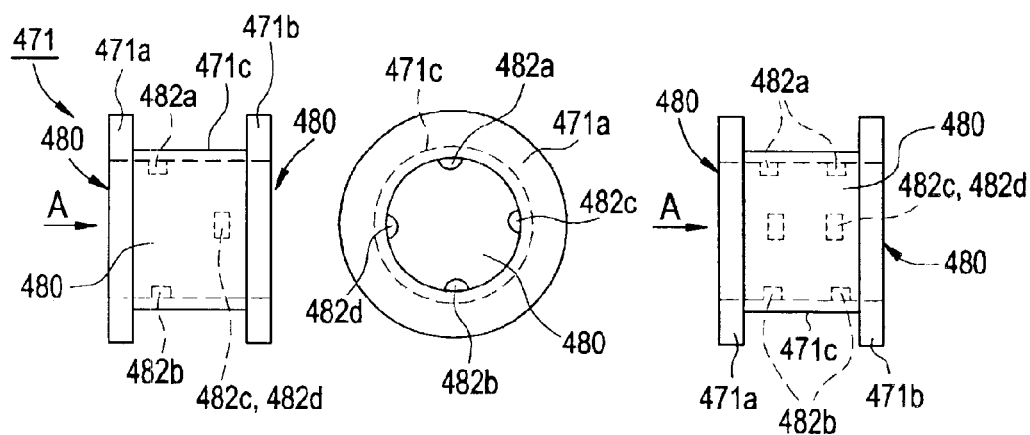
FIGS. 8A, 8B, and 8C collectively illustrate a fourth embodiment of the bobbin structure of the present invention, where

FIGS. 8A, 8B, and 8C collectively illustrate a fourth preferred embodiment of the bobbin structure of the present invention. FIG. 8A is a frontal view, and FIGS. 8B and 8C are left side views. FIG. 8C is a drawing of another embodiment that has a different arrangement for the protrusions from FIG. 8B. The bobbin 471 disposed in the stator transformer 407 is constructed from a well-known plastic or other synthetic resin and through holes 480 are formed on the spool 471c, supporting a stator winding (not shown), and collars 471a and 471b.

In FIG. 8A, each of protrusions 482a, 482b, 482c, and 482d are formed in a standing manner. Two each of the protrusions 482a and 482b, and protrusions 482c and 482d are formed in a standing manner inside the spool 471c at equal intervals, e.g., at 180-degree intervals. The protrusions 482a and 482b, and the protrusions 482c and 482d are shifted from each other 90 degrees. See FIG. 8B. In FIG. 8C, two lines of protrusions 482a, 482b, 482c, and 482d are formed in a standing manner at equal intervals on the interior of the spool 471c. Four of the protrusions 482a, 482b, 482c, and 482d, for example at 90-degree intervals, are formed in a standing manner. Two lines of protrusions 482a, 482b, 482c, and 482d are provided at identical locations relative to each other, and they are formed on the collars 471a and 471b of the bobbin 471 approximately in parallel.

In summary, the present invention provides a bobbin supporting a winding adapted to be disposed in a circular core, which core includes circular top and bottom core collars having first and second bores, respectively, and a cylindrical member maintaining the top and bottom core collars at a predetermined distance from one another, the first and second bores defining a core bore that is concentric with the rotation axis of the core. The bobbin advantageously includes a spool that supports the winding, top and bottom bobbin collars coupled on either side of the spool, and protrusions disposed on the bobbin, the protrusions permitting the bobbin to be press fit into the circular core so as to prevent relative motion between the circular core and the bobbin. If desired, the protrusions can ensure that the centerline of the bore and the centerline of the bobbin are coincident.

In a first exemplary embodiment of the bobbin according to the present invention, the cylindrical member is coupled to the outer peripheries of the top and bottom core collars, and the protrusions are disposed on the periphery of at least one of the top and bottom bobbin collars. It will be appreciated that, in this case, the swept diameter of the protrusions preferably is greater than the interior diameter of the cylindrical member.

According to a second exemplary embodiment of the bobbin according to the present invention, the cylindrical member is coupled to the outer peripheries of the top and bottom core collars, the protrusions are disposed on the opposing surfaces of the top and bottom bobbin collars, and the axial length of the bobbin and the protrusions is greater than the axial length of the cylindrical member. If desired, the protrusions can be located proximate to the first and second bores.

In a third exemplary embodiment of the bobbin according to the present invention, the cylindrical member is coupled to the outer peripheries of the top and bottom core collars, the protrusions are disposed on one of the opposing surfaces of the top and bottom bobbin collars, and the axial length of the bobbin and the protrusions is greater than the axial length of the cylindrical member. It may be desirable that these protrusions be located proximate to one of the first and second bores.

In a fourth exemplary embodiment of the bobbin according to the present invention, the cylindrical member is a rotary shaft having a shaft bore coincident with the core bore, the bobbin includes first and second bobbin bores and a spool bore located in the first and second bobbin collars and the spool, respectively, the first and second bobbin bores and the spool bore each having a diameter greater than the outer diameter of the rotary shaft, the protrusions are disposed in at least one of the first and second bobbin bores, and the swept diameter of the protrusions is smaller than the outer diameter of the rotary shaft. If desired, the protrusions advantageously can be located in both of the first and second bobbin bores.

According to a fifth exemplary embodiment of the bobbin according to the present invention, the cylindrical member is a rotary shaft having a shaft bore coincident with the core bore, the bobbin includes first and second bobbin bores and a spool bore located in the first and second bobbin collars and the spool, respectively, the first and second bobbin bores and the spool bore each having a diameter greater than the outer diameter of the rotary shaft, the protrusions are disposed on the interior surface of the spool on the spool bore, and the protrusions define an opening with a minimum diameter that is smaller than the outer diameter of the rotary shaft. It may be desirable to have the protrusions disposed in a predetermined pattern.

In a sixth exemplary embodiment of the bobbin according to the present invention, the cylindrical member is a rotary shaft having a shaft bore coincident with the core bore, the bobbin includes first and second bobbin bores and a spool bore located in the first and second bobbin collars and the spool, respectively, the first and second bobbin bores and the spool bore each having a diameter greater than the outer diameter of the rotary shaft, the protrusions are disposed on the interior surface of the spool in the spool bore and on at least one of the first and second bobbin collars, and at least one of the axial length of the bobbin and the protrusions is greater than the axial length of the rotary shaft and the swept diameter of the protrusions is smaller than the outer diameter of the rotary shaft. Preferably, the protrusions disposed in the spool bore are arranged in a predetermined pattern.

The inventive bobbin advantageously can be employed in a rotary transformer. In that case, the rotary transformer includes both a circular core made up of circular top and bottom core collars having first and second bores, respectively, and a cylindrical member maintaining the top and bottom core collars parallel to one another and separated from one another by a predetermined distance, and the bobbin made up of a spool adapted to support a winding, top and bottom bobbin collars coupled on either side of the spool, and protrusions disposed on the bobbin, where the first and second bores define a core bore that is concentric with the rotation axis of the core, and the protrusions permit the bobbin to be press fit into the circular core so as to prevent relative motion between the circular core and the bobbin during rotation. If desired, the cylindrical member is a rotary shaft having a shaft bore coincident with the core bore, the bobbin includes first and second bobbin bores and a spool bore located in the first and second bobbin collars and the spool, respectively, the first and second bobbin bores and the spool bore each having a diameter greater than the outer diameter of the rotary shaft, and the spool is coaxial with the core bore.

The inventive bobbin can also be employed in an inductor including a core fabricated from a bottom plate, and a cylinder member coupled to and perpendicular to the bottom plate, and a bobbin fabricated from a spool adapted to support a winding, top and bottom bobbin collars coupled on either side of the spool, and protrusions disposed on the bobbin, where the top and bottom collars and the spool include first and second bores and a spool bore, respectively, defining a bobbin bore, the bobbin bore is concentric with the centerline of the cylinder member, the protrusions permit the bobbin to be press fit with respect to the core so as to prevent further relative motion between the core and the bobbin. It may be desirable if the protrusions are disposed in a predetermined pattern in the bobbin bore.

In short, the structure of the bobbin according to the present invention, which can be employed in a transformer or an inductor, includes a spool supporting a winding with collars disposed on either end of the spool. Multiple protrusions are formed on at least one outside, i.e., having no winding, surface of the bobbin. These protrusions permit the bobbin to be precisely fit into the interior of the core. Consequently, process steps regarding adhesive application and subsequent drying, and their corresponding processes, i.e., processes that control the amount of adhesive applied, the area to which the adhesive is applied, and parameters such as drying time and temperature advantageously can be eliminated. Thus, devices, e.g., transformers and inductors, employing the bobbin according to the present invention can be fabricated with increased reliability, i.e., the devices employing the inventive bobbin resist damage due to oscillation and shocks.

It should also be mentioned that the present invention is not limited to the exemplary embodiments illustrated in FIGS. 1A through 8C. The various locations of the protrusions 182, 282, 382a,b, and 482a–d advantageously can be chosen so as to provide any desired degree of rigidity between the spool and the surrounding core. For example, the inner-rotor rotary core configuration is depicted as employing the peripheral protrusions on the collars of the bobbin 171 in FIGS. 1A and 1B. The protrusions 382a, 382b illustrated in FIGS. 6A and 6B advantageously can be employed, either alone or in combination with the protrusions 182, to maintain the bobbin 171 in a predetermined position with respect to core portion 172. It will be noted that the protrusions 382a, 382b can engage the bores 280 of the core portions 270, 272, to ensure that the bobbin and the core are locked in a coaxial arrangement. Other arrangements, permutations, and combinations will occur to one of ordinary skill in the art after reviewing the instant specification and accompanying drawing figures, and all such arrangements, permutations, and combinations are believed to fall within the scope of the present invention.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A bobbin supporting a winding disposed in a circular core including circular top and bottom core collars having first and second bores, respectively, and a cylindrical member maintaining the top and bottom core collars at a predetermined distance from one another, the first and second bores defining a core bore that is concentric with the rotation axis of the core, comprising:

a spool that supports the winding;

top and bottom bobbin collars coupled on either side of the spool; and protrusions disposed on the bobbin, the protrusions permitting the bobbin to be press fit into the circular core so as to prevent relative motion between the circular core and the bobbin.

2. The bobbin as recited in claim 1, wherein the protrusions ensure that the centerline of the bore and the centerline of the bobbin are coincident.

3. The bobbin as recited in claim 1, wherein:

the cylindrical member is coupled to the outer peripheries of the top and bottom core collars; and the protrusions are disposed on the periphery of at least one of the top and bottom bobbin collars.

4. The bobbin as recited in claim 3, wherein the swept diameter of the protrusions is greater than the interior diameter of the cylindrical member.

5. The bobbin as recited in claim 1, wherein:

the cylindrical member is coupled to the outer peripheries of the top and bottom core collars;

the protrusions are disposed on the opposing surfaces of the top and bottom bobbin collars; and the axial length of the bobbin and the protrusions is greater than the axial length of the cylindrical member.

6. The bobbin as recited in claim 5, wherein the protrusions are located proximate to the first and second bores.

7. The bobbin as recited in claim 1, wherein:

the cylindrical member is coupled to the outer peripheries of the top and bottom core collars;

the protrusions are disposed on one of the opposing surfaces of the top and bottom bobbin collars; and the axial length of the bobbin and the protrusions is greater than the axial length of the cylindrical member.

8. The bobbin as recited in claim 7, wherein the protrusions are located proximate to a respective one of the first and second bores.

9. The bobbin as recited in claim 1, wherein:

the cylindrical member comprises a rotary shaft having a shaft bore coincident with the core bore;

the bobbin includes first and second bobbin bores and a spool bore located in the first and second bobbin collars and the spool, respectively, the first and second bobbin bores and the spool bore each having a diameter greater than the outer diameter of the rotary shaft;

the protrusions are disposed in at least one of the first and second bobbin bores; and the swept diameter of the protrusions is smaller than the outer diameter of the rotary shaft.

10. The bobbin as recited in claim 9, wherein the protrusions are located in both of the first and second bobbin bores.

11. The bobbin as recited in claim 1, wherein:

the cylindrical member comprises a rotary shaft having a shaft bore coincident with the core bore;

the bobbin includes first and second bobbin bores and a spool bore located in the first and second bobbin collars and the spool, respectively, the first and second bobbin bores and the spool bore each having a diameter greater than the outer diameter of the rotary shaft;

the protrusions are disposed on the interior surface of the spool on the spool bore; and the protrusions define an opening with a minimum diameter that is smaller than the outer diameter of the rotary shaft.

12. The bobbin as recited in claim 11, wherein the protrusions are disposed in a predetermined pattern.

13. The bobbin as recited in claim 1, wherein:

the cylindrical member comprises a rotary shaft having a shaft bore coincident with the core bore;

the bobbin includes first and second bobbin bores and a spool bore located in the first and second bobbin collars and the spool, respectively, the first and second bobbin bores and the spool bore each having a diameter greater than the outer diameter of the rotary shaft;

the protrusions are disposed on the interior surface of the spool in the spool bore and on at least one of the first and second bobbin collars; and at least one of the axial length of the bobbin and the protrusions is greater than the axial length of the rotary shaft and the swept diameter of the protrusions is smaller than the outer diameter of the rotary shaft.

14. The bobbin as recited in claim 13, wherein the protrusions disposed in the spool bore are arranged in a predetermined pattern.

15. A rotary transformer, comprising:

a circular core including:

circular top and bottom core collars having first and second bores, respectively; and a cylindrical member maintaining the top and bottom core collars parallel to one another and separated from one another by a predetermined distance; and a bobbin comprising:

a spool adapted to support a winding;

top and bottom bobbin collars coupled on either side of the spool; and protrusions disposed on the bobbin, wherein:

the first and second bores define a core bore that is concentric with the rotation axis of the core; and the protrusions permit the bobbin to be press fit into the circular core so as to prevent relative motion between the circular core and the bobbin during rotation.

16. The rotary transformer as recited in claims 15, wherein:

the cylindrical member comprises a rotary shaft having a shaft bore coincident with the core bore;

the bobbin includes first and second bobbin bores and a spool bore located in the first and second bobbin collars and the spool, respectively, the first and second bobbin bores and the spool bore each having a diameter greater than the outer diameter of the rotary shaft; and the spool is coaxial with the core bore.

17. An inductor comprising:

a core including:

a bottom plate; and a cylinder member coupled to and perpendicular to the bottom plate; and a bobbin comprising:

a spool adapted to support a winding;

top and bottom bobbin collars coupled on either side of the spool; and protrusions disposed on the bobbin, wherein:

the top and bottom collars and the spool include first and second bores and a spool bore, respectively, defining a bobbin bore;

the bobbin bore is concentric with the centerline of the cylinder member;

the protrusions permit the bobbin to be press fit with respect to the core so as to prevent further relative motion between the core and the bobbin.

18. The inductor as recited in claim 17, wherein the protrusions are disposed in a predetermined pattern in the bobbin bore.

* * * * *